United States Patent [19]

Sturm

[11] Patent Number: 5,468,284
[45] Date of Patent: Nov. 21, 1995

[54] METHOD OF WATERPROOF WOOD AND ASSOCIATED COMPOSITION

[75] Inventor: Jeffrey C. Sturm, Pittsburgh, Pa.

[73] Assignee: Kop-Coat, Inc., Pittsburgh, Pa.

[21] Appl. No.: 266,273

[22] Filed: Jun. 27, 1994

[51] Int. Cl.⁶ .................................................. C09K 3/18
[52] U.S. Cl. ................. 106/2; 106/18.29; 106/18.32; 106/18.33; 427/297; 427/393; 427/421; 427/440
[58] Field of Search ............ 106/18.32, 2, 183.31, 106/18.29, 270, 271, 272; 427/384, 421, 440, 297; 514/642, 643

[56] References Cited

U.S. PATENT DOCUMENTS

| | | | |
|---|---|---|---|
| 4,013,804 | 3/1977 | Gruetzman | 106/18.28 |
| 4,313,977 | 2/1982 | Johnson et al. | 427/440 |
| 4,360,385 | 11/1982 | Grunewalder | 106/18.32 |
| 4,379,890 | 4/1983 | Konietzny et al. | 106/18.32 |
| 4,404,239 | 9/1983 | Grunewalder | 106/18.32 |
| 4,432,797 | 2/1984 | Vasishth et al. | 106/34 |
| 4,496,613 | 1/1985 | Zagefka et al. | 106/18.32 |
| 4,615,739 | 10/1986 | Clark et al. | 106/34 |
| 4,761,179 | 8/1988 | Goettsche et al. | 106/18.32 |
| 4,764,214 | 8/1988 | Marx et al. | 106/18.32 |
| 4,866,106 | 9/1989 | Pellow et al. | 532/122 |
| 4,871,473 | 10/1989 | Goettsche et al. | 106/18.36 |
| 4,950,685 | 8/1990 | Ward | 514/479 |
| 4,990,547 | 2/1991 | Stovicek | 424/405 |
| 5,096,488 | 3/1992 | Stovicek | 106/18.32 |
| 5,112,396 | 5/1992 | Hegarty | 106/18.32 |
| 5,173,110 | 12/1992 | Stovicek | 106/18.32 |
| 5,270,083 | 12/1993 | Lotz | 106/18.31 |
| 5,304,237 | 4/1994 | Barth et al. | 106/18.32 |
| 5,344,482 | 9/1994 | Landsiedel et al. | 106/18.33 |

OTHER PUBLICATIONS

Chem. Abstracts, vol. 87, No. 87:103500p, Butcher et al. (1987) (No Month).
Chem. Abstracts, vol. 92, No. 92:75897f (1980) (No Month).

*Primary Examiner*—Anthony Green
*Attorney, Agent, or Firm*—Eckert Seamans Cherin & Mellott

[57] ABSTRACT

A method of treating wood to provide anti-stain and anti-decay waterproofing properties includes applying to the wood a water solution having about 1.3 to 2.75 weight percent of a quaternary ammonium compound, about 1 to 2 weight percent of a hydrated starch solution, about 2.5 to 5.0 weight percent of a slack wax water emulsion and about 90 to 95 weight percent water. The solution may be created by establishing a first mixture of hydrated starch solution, slack wax emulsion and water and subsequently admixing the quaternary ammonium compound with a first mixture. Preferred solid concentrations of the emulsions are provided. A wood waterproofing composition contains about 1.3 to 2.75 weight percent of a quaternary ammonium compound, about 1 to 2 weight percent of a hydrated starch solution, about 2.5 to 5.0 weight percent of a slack wax emulsion and about 93 to 97.5 weight percent water. The waterproofing composition concentrate, prior to admixture with the quaternary ammonium compound, contains the hydrated starch solution and slack wax emulsion. An adhesion promoter, such as an acrylic polymer, may be employed. Other additives may be employed.

33 Claims, No Drawings

METHOD OF WATERPROOF WOOD AND ASSOCIATED COMPOSITION

BACKGROUND OF THE INVENTION

1. Field of the Invention

The present invention relates to a method of waterproofing wood and simultaneously providing stain resistant and decay resisting properties thereto and to compositions which are employed in achieving these objectives.

2. Description of the Prior Art

The beneficial properties of wood have been employed advantageously in numerous end uses for centuries. For example, wood has been used in the construction of buildings and building products, such as windows and doors. Wood has been employed in view of its relatively high strength, ease of processing and handling, and relatively low cost. Wood, however, has the negative aspect of being susceptible to deterioration under the influence of moisture, microorganisms, and insects.

It has been known to treat wood with protective coatings as by applying paint to exposed wood surfaces, for example.

It has also been known to treat wood with preservatives, such as copper-chromium-arsenic solutions (CCA), pentachlorophenol and creosote oil with application being effected by pressure impregnation. It has also been known to treat wood through immersion in solutions containing salts of chlorinated phenols. These chlorinated phenols, however, have become of great concern from a human safety and environmental hazard standpoint.

The United States millwork industry requires that wooden parts intended to be used for window manufacturers must be treated with a water repellant wood preservative solution. This requirement is set forth in the National Wood Window and Door Association Specification NWWDA I.S. 4-81. Traditionally, most millwork preservatives were carried in a mineral spirits solvent to facilitate penetration into the wood and drying of the treated wood prior to painting or cladding. Recent amendments to the United States Clean Air Act, however, have caused millwork manufacturers to look for ways to reduce the solvent emissions from their facilities. This has led to increased interest in development of water borne millwork preservative systems.

It has been known to employ didecyldimethyl ammonium chloride to resist wood damaging fungi and termites. See, generally, Chemical Abstracts, Vol. 87, No. 87:103500p, Butcher et al. (1987).

It has also been known to employ 3-iodo-2-propynyl butyl carbamate as an active ingredient against fungi. See, generally, Chemical Abstracts, Vol. 92, No. 92:75897f, Singer (1980).

U.S. Pat. No. 4,950,685, the disclosure of which is incorporated herein by reference, provides a synergistic wood preservative composition which has a quaternary ammonium compound and 3-iodo-2-propynyl butyl carbamate. It also discloses certain preferred quaternary ammonium compounds, such as didecyldimethyl ammonium chloride, tri-methyl-coco-ammonium chloride and dimethyl-di-coco-ammonium chloride. This disclosure provides for improved stain resistance in wood, as well as certain additional beneficial properties.

While it has been known to make advantageous use of such prior art quaternary ammonium compounds, they have not been readily combinable with known waterbased waterproofing compositions usable in wood. The problem has arisen due to the quaternary ammonium compounds being cationically charged molecules which are extremely hydrophilic and have, in fact, served as effective wetting agents. These properties are obviously undesirable for a composition wherein water repellant properties are being sought.

U.S. Pat. No. 4,615,739 discloses an oil-in-water-in-oil coating material which employs polysaccharide, which is a hydrated starch. It is said to have a non-aqueous continuous phase and an aqueous discontinuous phase and is said to be usable as a coating which is said to have superior weathering, wetting, adhesion and stability characteristics. There is no wax emulsion or quaternary ammonium compound employed.

U.S. Pat. No. 4,432,797 discloses a water-based stain which is said to resist pigments settling prior to use. The formulation includes a film-forming resin, pigment, water thickener, and water. The film-forming resin is disclosed as being an acrylic resin.

U.S. Pat. No. 4,866,106 discloses an antifouling coating composition which includes a non-metallic algicide which is a quaternary ammonium compound and a non-metallic algicide. See, also, U.S. Pat. Nos. 4,990,547 and 5,096,488.

In spite of these known materials, there is lacking a method and associated composition for effectively resisting undesired deterioration of wood by combining waterproofing properties with other desired preservative properties, such as anti-stain and anti-fungal properties.

SUMMARY OF THE INVENTION

The present invention has provided a method for treating wood with a composition that will produce desired waterproofing and stain-resisting and decay resisting properties, as well as other properties. It also provides unique compositions for use in such methods.

In a preferred practice of the invention, a composition is applied to the wood by any desired means, such as by spraying, pressure treating, vacuum treating, brushing, dipping or other suitable means. The composition preferably is a water solution having about 1.3 to 2.75 weight percent of a quaternary ammonium compound, about 1 to 2 weight percent of a hydrated starch solution, about 2.5 to 5.0 weight percent of a slack wax water emulsion and about 90 to 95 weight percent water. The quaternary ammonium compound is preferably selected from the group consisting of didecyldimethyl ammonium chloride, tri-methyl-coco-ammonium chloride and dimethyl-di-coco-ammonium chloride. The treated wood product is characterized by enhanced waterproofing and stain-resistance.

In a preferred practice of the invention, the solution contains about 2.5 to 5.0 weight percent of an adhesion promoter, such as an acrylic polymer. It may also have an bactericide, such as an isothiazolone included.

In creating the solution, it is preferred to create a first mixture by admixing the hydrated starch solution with the slack wax emulsion in water and, subsequently, admixing this first mixture with the quaternary ammonium compound. The waterproofing composition may be supplied in two components with one component being a water solution of about 1 to 2 weight percent of hydrated starch solution, about 2.5 to 5.0 weight percent of slack wax emulsion, and about 93 to 96.5 weight percent water to which the quaternary ammonium compound is added and mixed.

It is an object of the present invention to provide an improved method for protecting wood against water induced deterioration, as well as stain and other sources of decomposition or aesthetic characteristics and to provide a composition for use in such method.

It is a further object of the present invention to provide such a solution which is water based and may effectively contain a quaternary ammonium compound.

It is a further object of the present invention to provide such a system which has desired solution stability and may be prepared and employed by the use of conventional apparatus and methods.

It is a further object of the present invention to provide such a system which provides enhanced adhesion promotion of coating materials subsequently applied to the resultant product.

It is a further object of the present invention to provide such a solution wherein the combination of a quaternary ammonium compound and waterproofing compound does not result in formation of undesired flocculates, agglomerates or have a lack of homogeneity after gentle mixing.

It is yet another object of the present invention to provide effectively protected wood products for use in building construction, including as frames for windows and doors.

These and other objects of the invention will be more fully understood on reference to the following disclosure.

DESCRIPTION OF THE PREFERRED EMBODIMENTS

While for convenience of reference herein, the expression "wood" will be used generically and broadly, it will be understood that, in general, the primary use of the method and materials disclosed herein will be on raw lumber or semi-fabricated or fabricated products. This term shall expressly include wood and wood composites which may, for example, be wood in combination with resins, adhesives, waxes and other compatible materials.

In a preferred practice of the invention, a water solution containing the composition of the present invention is applied to the wood by at least one of the following means: spraying; pressure treating; vacuum treating; brushing; and dipping.

The composition preferably consists of about 1.3 to 2.75 weight percent of a quaternary ammonium compound, about 1 to 2 weight percent of a hydrated starch solution, about 2.5 to 5.0 weight percent of a slack wax emulsion, and about 90 to 95 weight percent water.

The quaternary ammonium compound may be any such compound having the desired properties for preserving wood. It is preferred to use as the quaternary ammonium compound, a compound selected from the group consisting of didecyldimethyl ammonium chloride, tri-methyl-coco-ammonium chloride and di-methyl-di-coco-ammonium chloride. Among the preferred quaternary ammonium compounds, is a composition comprising one of the above-identified quaternary ammonium compounds and 3-iodo-2-propynyl butyl carbamate. The preferred quaternary ammonium compound is a composition comprising didecyldimethyl ammonium chloride and 3-iodo-2-propynyl butyl carbamate. A suitable quaternary ammonium compound is that sold under the trade designation "NP-1" by Kop-Coat, Inc. of Pittsburgh, Pa. These materials are disclosed in detail in U.S. Pat. No. 4,950,685. It is preferred that the quaternary ammonium compound be present in about 4 to 20 parts by weight of the quaternary compound by one part by weight of 3-iodo-2-propynyl butyl carbamate. In general, the composition will contain about 1 to 80 parts by weight of the quaternary ammonium compound per about 1 to 10 parts by weight of 3-iodo-2-propynyl butyl carbamate.

The hydrated starch solution, which is a polysaccharide resin, may have a pH (neat) of about 6.4 to 7.5. The resin may contain about 30 to 50 weight percent solids and preferably about 35 to 45 weight percent solids. It may contain about 29 weight percent propylene glycol and about 31 percent water. A suitable material for this purpose is the material sold under the trade designation "JK 270 Resin" by Lorama Chemicals, Inc. of Milton, Ontario, Canada.

The slack wax emulsion contains about 30 to 60 percent solids in a water emulsion and preferably about 45 to 50 percent solids. About 3 to 4 weight percent of the solids are emulsifiers with the balance of the solids being emulsified slack wax. The slack wax will have a penetration hardness at 77° F. (ASTM D 1321) of about 50 to 80 and a Saybolt viscosity at 210° F., SUs of about 35 to 38.

Slack wax is an unrefined grade of paraffin wax. It is the portion of the first distillate taken from petroleum after the cracking process and after filtering and separation from the oils with the wax collecting on plates and contains approximately 50 percent wax and 50 percent oil. This is chilled to separate the wax from the oil. As used herein, the expression "slack wax" will refer to the "yellow wax" which is obtained in this manner and less than fully refined paraffin wax which is obtained from such yellow wax. Such wax will generally contain about 2 to 25 percent oil and most typically around 10 to 20 percent. Slack wax has a melting point range of about 120° F. to 140° F. A suitable slack wax is that sold under the trade designation "Microlube N" by Hercules Incorporated of Wilmington, Del.

The waterproofing composition may have a first mixture comprising about 1 to 2 weight percent of a hydrated starch solution, about 2.5 to 5.0 weight percent slack wax emulsion and about 93 to 96.5 weight percent water to which the quaternary ammonium compound is added.

It has been found that the foregoing composition, despite the general difficulty with combining waterproofing materials with quaternary ammonium compounds due to the cationic hydrophilic nature of the quaternary ammonium compounds has surprisingly produced the beneficial blend of properties which has the stain resistant, decay resistant, and other beneficial properties of the quaternary ammonium compound while providing enhanced water repellant characteristics.

If desired, other appropriate additives may be used. One preferred addition to the formulation is the use of about 2.5 to 5.0 weight percent of an adhesion promoter, such as an acrylic polymer. This adhesion promoter facilitates adherence of paints, stains and other materials that might be applied to the wood surface for decorative or protective purposes. A suitable adhesion promoter is that sold under the trade designation "Rhoplex B-15J Emulsion" or "Rhoplex B-15 Emulsion" by Rohm & Haas Company of Philadelphia, Pa. This emulsion contains about 44 to 48 weight percent solids in the form of an acrylic polymer in about 52 to 56 weight percent water.

In order to provide resistance to growth of fungi and other microorganisms, an bactericide may be added in the amount of about 0.001 to 1.0 weight percent. An example of a suitable bactericide is a isothiazolone. A suitable bactericide is a mixture of two isothiazolinones sold under the trade designation "KATHON WT."

In order to provide additional insight into the invention, several examples will be considered.

EXAMPLE 1

A first mixture consisting of 15.606 pounds of slack wax emulsion having 47 weight percent solids (Microlube N) and 6.242 pounds of hydrated starch solution having 29 weight percent solids (JK270 resin) and 15.606 pounds of adhesion promoter (B15J) having 46 weight percent solids was admixed with 370.09 pounds of water for 15 minutes at medium speed. Subsequently, 8.614 pounds of a quaternary ammonium compound consisting of didecyldimethyl ammonium chloride and 3-iodo-2-propynyl butyl carbamate was mixed with the first mixture for about 15 minutes. This yielded 416.16 pounds or 50 gallons of the waterproofing composition of the present invention.

The composition was applied to a plurality of Ponderosa pine sticks (1 inch by 1 inch by 18 inches). The samples were dried for 7 minutes at 120° F. using a forced air drier. The samples were immersed in water for three minutes and subsequently the change in weight was determined and the samples were measured for dimensional changes due to swelling of the samples to determine the extent of water absorption. The waterproofing solutions were monitored during treating to evaluate separation and formation of particulates. These tests were run in comparison with other wood samples protected with standard commercial water repellant wood preservatives. Parts treated with the standard preservatives exhibited substantially greater weight gains and dimensional swelling than the parts treated with the formulation of the present invention. The solutions of the present invention exhibited no appreciable separation or formation of coagulants.

EXAMPLE 2

The procedure of Example 1 was followed employing a formulation which consisted of 15.606 pounds of the slack wax water emulsion (Microlube N) and 6.242 pounds of the hydrated starch solution (JK270 resin), but no adhesion promoter (B15J). The results were successful and essentially the same as with respect to Example 1 with the exception that the solution of this example exhibited exceptionally low swelling behavior which was lower than that of the solution of the invention tested in Example 1.

A standard test for determining water repellant effectiveness of formulations is the National Wood Window and Door Association Swellometer (NWWDA TM-2) (May 1, 1994) which determines dimensional changes in wood submerged in water as a means for testing for water repellant effectiveness. In order to comply with this standard, a wood sample must have a minimum Swellometer water repellency performance of 60 percent or greater. The compositions of the present invention have been found to meet this standard.

It will be appreciated that the mixing of the composition may be achieved in automated fashion by providing a source of water with an associated flow meter, flow sensor and solenoid valve, as well as sources of (a) the quaternary ammonium compound and (b) the materials mixed in the first mixture with associated metering pumps and solenoid valves. In-line mixers can be provided with circulation into a tank into which the wood is dipped being provided for. The mixing may, for example, be accomplished by any suitable power drive agitator or circulating pump.

In addition to the aforementioned compositions, one might wish to use additives which are well known to those skilled in the art, such as insecticides, colorants, penetrants, or defoamers.

It will be appreciated, therefore, that the present invention provides a method of effectively combining wood preservative and water repellant characteristics in a wood product and a related quaternary ammonium composition for treating the same. As water is employed in the solutions, the health and safety problems, as well as environmental problems of prior art systems have been minimized. Also, the present invention achieves this while overcoming the inconsistent properties of quaternary ammonium compounds in respect of their cationic properties which lead to undesired hydrophilic properties. All of this has been accomplished in a manner which is consistent with existing industry standards, equipment and procedures.

A preferred formula for the present invention would involve about 1.51 weight percent of the quaternary ammonium compound, about 1.50 weight percent of the hydrated starch solution and 3.75 weight percent of the slack wax water emulsion, along with 93.24 weight percent of water.

Whereas particular embodiments of the invention have been described herein for purposes of illustration, it will be evident to those skilled in the art that numerous variations of the details may be made without departing from the invention as defined in the appended claims.

I claim:

1. A method of treating wood comprising
    applying to said wood a composition comprising a water solution having about 1.3 to 2.75 weight percent of a quaternary ammonium compound,
    about 1 to 2 weight percent of a hydrated starch solution,
    about 2.5 to 5.0 percent weight of a slack wax water emulsion, and
    about 90 to 95 weight percent water.
2. The method of claim 1 wherein said applying of said water solution to said wood is effected by at least one of spraying, pressure treating, vacuum treating, brushing and dipping.
3. The method of claim 1 wherein said quaternary ammonium compound is a compound selected from the group consisting of didecyldimethyl ammonium chloride, tri-methyl-coco-ammonium chloride, and dimethyl-di-coco-ammonium chloride.
4. The method of claim 3 wherein said composition includes 3-iodo-2 propynyl butyl carbamate.
5. The method of claim 3, wherein said quaternary ammonium compound is didecyldimethyl ammonium chloride and said composition includes 3-iodo-2 propynyl butyl carbamate.
6. The method of claim 1 further comprising about 2.5 to 5.0 weight percent of an adhesion promoter.
7. The method of claim 6 wherein said adhesion promoter is an acrylic polymer emulsion.
8. The method of claim 1 wherein in creating said solution a first mixture is established by mixing said hydrated starch with said slack wax emulsion and water, and
    subsequently said quaternary ammonium compound is admixed with said first mixture.
9. The method of claim 8 further comprising an bactericide.
10. The method of claim 9 wherein said bactericide is an isothiazolone.
11. The method of claim 1 wherein said slack wax emulsion is a wax emulsion having about 30 to 60 weight percent solids.
12. The method of claim 11 wherein said slack wax emulsion is a wax emulsion having about 45 to 50 weight percent solids.

13. The method of claim 1 wherein
said composition includes 3-iodo-2-propynyl butyl carbamate, and
said composition contains about 1 to 80 parts by weight quaternary ammonium compound per 1 to 10 parts by weight of 3-iodo-2-propynyl butyl carbamate.

14. The method of claim 11 wherein said hydrated starch solution is a solution having about 30 to 50 weight percent solids.

15. The method of claim 14 wherein said hydrated starch solution is a solution having about 35 to 45 weight percent solids.

16. The method of claim 13 wherein said quaternary ammonium compound contains about 4 to 20 parts by weight quaternary ammonium compound to about 1 part by weight of said 3-iodo-2-propynyl butyl carbamate.

17. A wood waterproofing composition comprising
about 1.3 to 2.75 weight percent of a quaternary ammonium compound,
about 1 to 2 weight percent of a hydrated starch solution,
about 2.5 to 5.0 weight percent of a slack wax emulsion, and
about 90 to 95 weight percent water.

18. The wood waterproofing composition of claim 17 wherein said quaternary ammonium compound is a compound selected from the group consisting of didecyldimethyl ammonium chloride, tri-methyl-coco-ammonium chloride, and dimethyl-di-coco-ammonium chloride.

19. The wood waterproofing composition of claim 18 wherein said composition includes 3-iodo-2 propynyl butyl carbamate.

20. The wood waterproofing composition of claim 18 wherein said quaternary ammonium compound is didecyldimethyl ammonium chloride and said composition includes 3-iodo-2 propynyl butyl carbamate.

21. The wood waterproofing composition of claim 17 further comprising about 2.5 to 5.0 weight percent of an adhesion promoter.

22. The wood waterproofing composition of claim 21 wherein said adhesion is an acrylic polymer emulsion.

23. The wood waterproofing composition of claim 22 further comprising an bactericide.

24. The wood waterproofing composition of claim 23 wherein said bactericide is an isothiazolone.

25. The wood waterproofing composition of claim 17 wherein said slack wax emulsion is a wax emulsion having about 30 to 60 weight percent solids.

26. The wood waterproofing composition of claim 25 wherein said slack wax emulsion is a wax emulsion having about 45 to 50 weight percent solids.

27. The wood waterproofing composition of claim 17 wherein
said composition includes 3-iodo-2-propynyl butyl carbamate, and
said composition contains about 1 to 80 parts by weight of said quaternary ammonium compound per 1 to 10 parts by weight of said 3-iodo-2-propynyl butyl carbamate.

28. The wood waterproofing composition of claim 27 wherein
said composition contains about 4 to 20 parts by weight of a quaternary ammonium compound to about 1 part by weight of said 3-iodo-2-propynyl butyl carbamate.

29. The wood waterproofing composition of claim 17 wherein said hydrated starch solution has about 30 to 50 weight percent solids.

30. The wood waterproofing composition of claim 29 wherein said hydrated starch solution has about 35 to 45 weight percent solids.

31. The wood waterproofing composition of claim 24 wherein said bactericide is an isothiazolone.

32. The wood waterproofing composition of claim 17 wherein said hydrated starch solution is a starch solution having about 30 to 50 weight percent solids.

33. The wood waterproofing composition of claim 22 wherein
said hydrated starch solution is a starch solution having about 35 to 45 weight percent solids.

\* \* \* \* \*